(12) United States Patent
Cheng et al.

(10) Patent No.: US 11,984,649 B2
(45) Date of Patent: May 14, 2024

(54) WEARABLE DEVICE

(71) Applicant: PEGATRON CORPORATION, Taipei (TW)

(72) Inventors: Kuo-Chi Cheng, Taipei (TW); Po-Yen Lai, Taipei (TW); Ping-Hung Lu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 138 days.

(21) Appl. No.: 17/739,021

(22) Filed: May 6, 2022

(65) Prior Publication Data
US 2023/0097880 A1 Mar. 30, 2023

(30) Foreign Application Priority Data

Sep. 28, 2021 (TW) .................. 110135970

(51) Int. Cl.
*H01Q 1/27* (2006.01)
*G06F 1/16* (2006.01)
*H01Q 1/36* (2006.01)
*H01Q 1/48* (2006.01)

(52) U.S. Cl.
CPC ............ *H01Q 1/273* (2013.01); *G06F 1/163* (2013.01); *G06F 1/1656* (2013.01); *H01Q 1/36* (2013.01); *H01Q 1/48* (2013.01)

(58) Field of Classification Search
CPC ...... G06F 1/163; G06F 1/1656; G06F 1/1698; H01Q 1/273; H01Q 1/36; H01Q 1/48; H01Q 21/28
See application file for complete search history.

(56) References Cited

U.S. PATENT DOCUMENTS

| 5,801,663 | A | * | 9/1998 | Lindenmeier | .......... | H01Q 23/00 343/704 |
| 2008/0284663 | A1 | * | 11/2008 | Arima | .................. | G06F 1/1662 343/702 |
| 2008/0285216 | A1 | * | 11/2008 | Kobayashi | ............ | G06F 1/1616 361/679.08 |

(Continued)

FOREIGN PATENT DOCUMENTS

| CN | 111029771 | 4/2020 |
| CN | 111293419 | 6/2020 |
| TW | M615566 | 8/2021 |

*Primary Examiner* — Thien M Le
(74) *Attorney, Agent, or Firm* — J.C. PATENTS

(57) ABSTRACT

A wearable device includes a conducting frame, a circuit board, and a grounding member. The conducting frame includes a first part and a second part that are separated. The circuit board has a system grounding surface and is disposed inside the conducting frame. The grounding member is disposed inside the conducting frame and connected to the first part. The first part and the grounding member are formed as a first antenna. The first part has a first feeding terminal. The grounding member has a first grounding terminal, and the first grounding terminal is connected to the system grounding surface of the circuit board. The second part is formed as a second antenna. The second antenna has a second feeding terminal, a second grounding terminal, and a third grounding terminal. The second and the third grounding terminals are connected to the system grounding surface of the circuit board.

15 Claims, 9 Drawing Sheets

(56) References Cited

U.S. PATENT DOCUMENTS

| | | | |
|---|---|---|---|
| 2009/0256759 A1* | 10/2009 | Hill | H01Q 9/06 |
| | | | 343/702 |
| 2010/0073241 A1* | 3/2010 | Ayala Vazquez | H01Q 1/2266 |
| | | | 343/702 |
| 2011/0006953 A1* | 1/2011 | Chiang | H01Q 1/2266 |
| | | | 343/702 |
| 2016/0049719 A1* | 2/2016 | Tseng | H01Q 9/42 |
| | | | 343/702 |
| 2019/0131696 A1* | 5/2019 | Hanshew | H01Q 21/28 |
| 2021/0066786 A1* | 3/2021 | Yarga | H01Q 1/243 |
| 2021/0066799 A1* | 3/2021 | Avser | H01Q 5/25 |
| 2021/0075090 A1* | 3/2021 | Yarga | H01Q 1/241 |

* cited by examiner

WEARABLE DEVICE

CROSS-REFERENCE TO RELATED APPLICATION

This application claims the priority benefit of Taiwan application serial no. 110135970, filed on Sep. 28, 2021. The entirety of the above-mentioned patent application is hereby incorporated by reference herein and made a part of this specification.

BACKGROUND

Technical Field

The disclosure relates to a wearable device, and in particular to a wearable device using a conducting frame as an antenna.

Description of Related Art

The length of the antenna is an important parameter used to adjust the antenna matching. For products that use metal frame as antennas, since most of today's products tend to be miniaturized, the demand for miniaturization will limit the lowest frequency band that the antenna may reach.

SUMMARY

The disclosure provides a wearable device, which may maintain a sufficient length from a feeding point to a grounding point on a miniaturized wearable device, so as to reach an ideal operating frequency band.

The wearable device of the disclosure includes a conducting frame, a circuit board, and a grounding member. The conducting frame includes a first part and a second part that are separated. The circuit board is disposed inside the conducting frame, and includes a system grounding surface. The grounding member is disposed inside the conducting frame and connected to the first part. The first part and the grounding member are formed as a first antenna. The first part has a first feeding terminal. The grounding member has a first grounding terminal, and the first grounding terminal is connected to the system grounding surface of the circuit board. The second part is formed as a second antenna. The second antenna has a second feeding terminal, a second grounding terminal, and a third grounding terminal. The second grounding terminal and the third grounding terminal are connected to the system grounding surface of the circuit board.

Based on the above, the disclosure may extend the length of the antenna grounding structure to meet the operating frequency requirements without changing the size or the appearance of the appearance member by the disposition of the grounding member, so that each of the antennas can achieve good matching. In addition, the disclosure may also adjust the impedance matching of the desired frequency band by modifying the length of the grounding member, thereby increasing the flexibility in use.

BRIEF DESCRIPTION OF THE DRAWINGS

FIG. 1b is an exploded view of the wearable device of FIG. 1a.

DESCRIPTION OF THE EMBODIMENTS

Figure 1A:
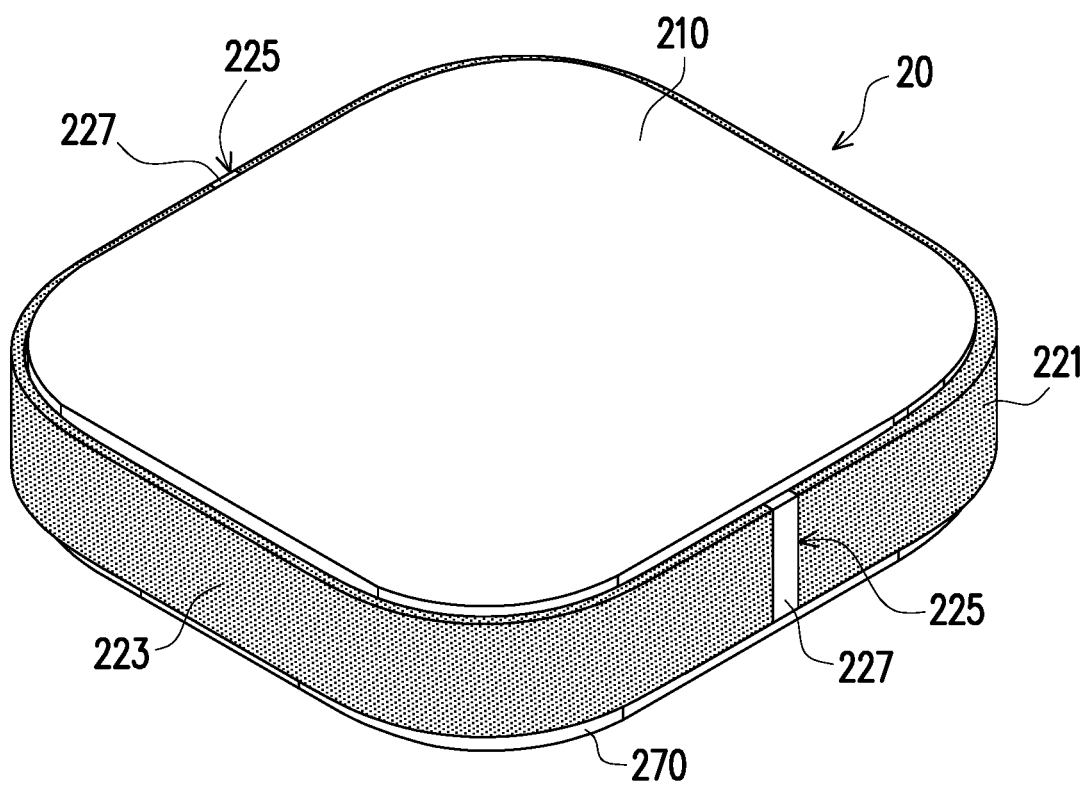
FIG. 1a is a schematic diagram of a wearable device according to an embodiment of the disclosure.
Figure 1B:
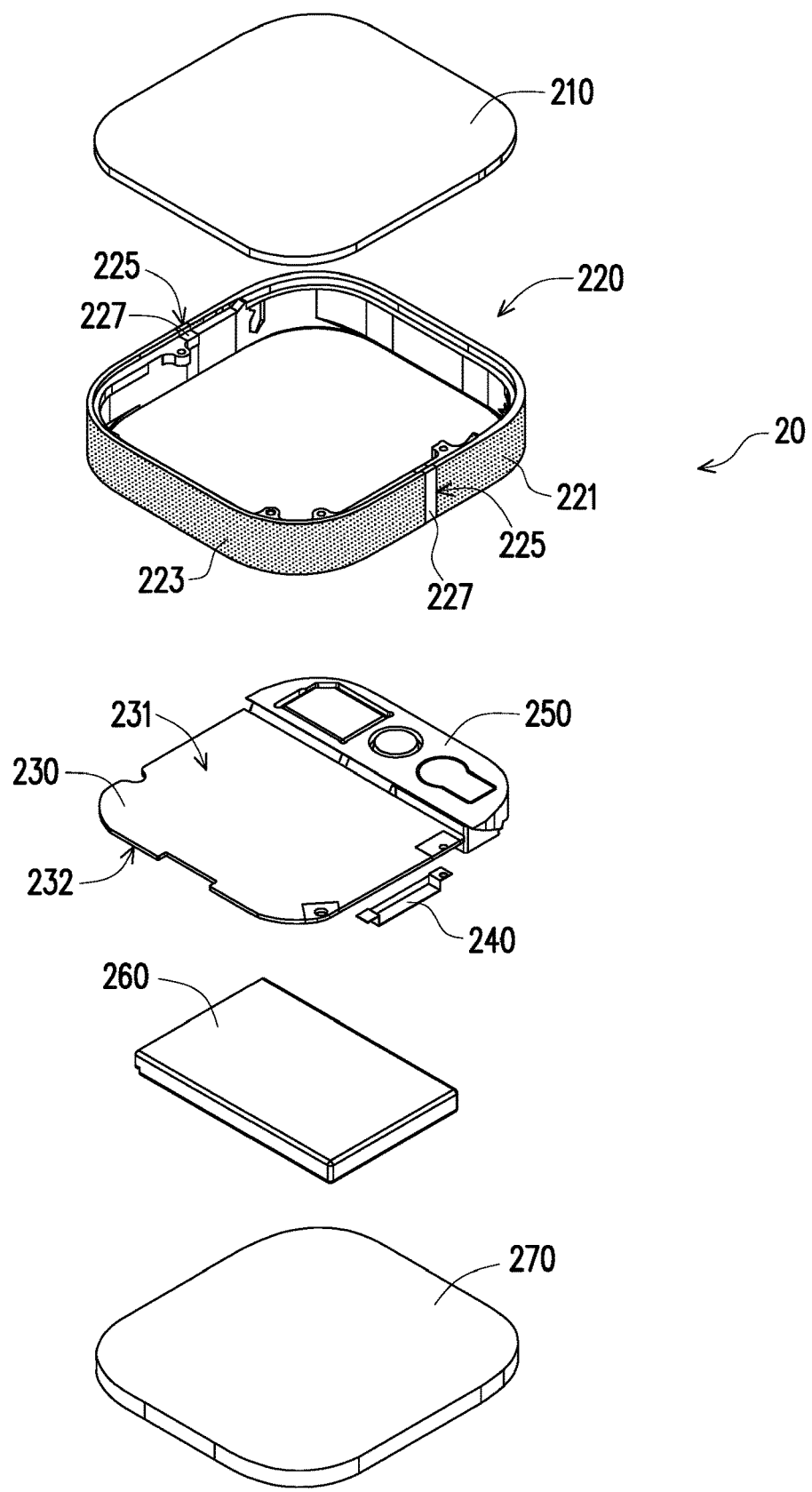
Figure 2:
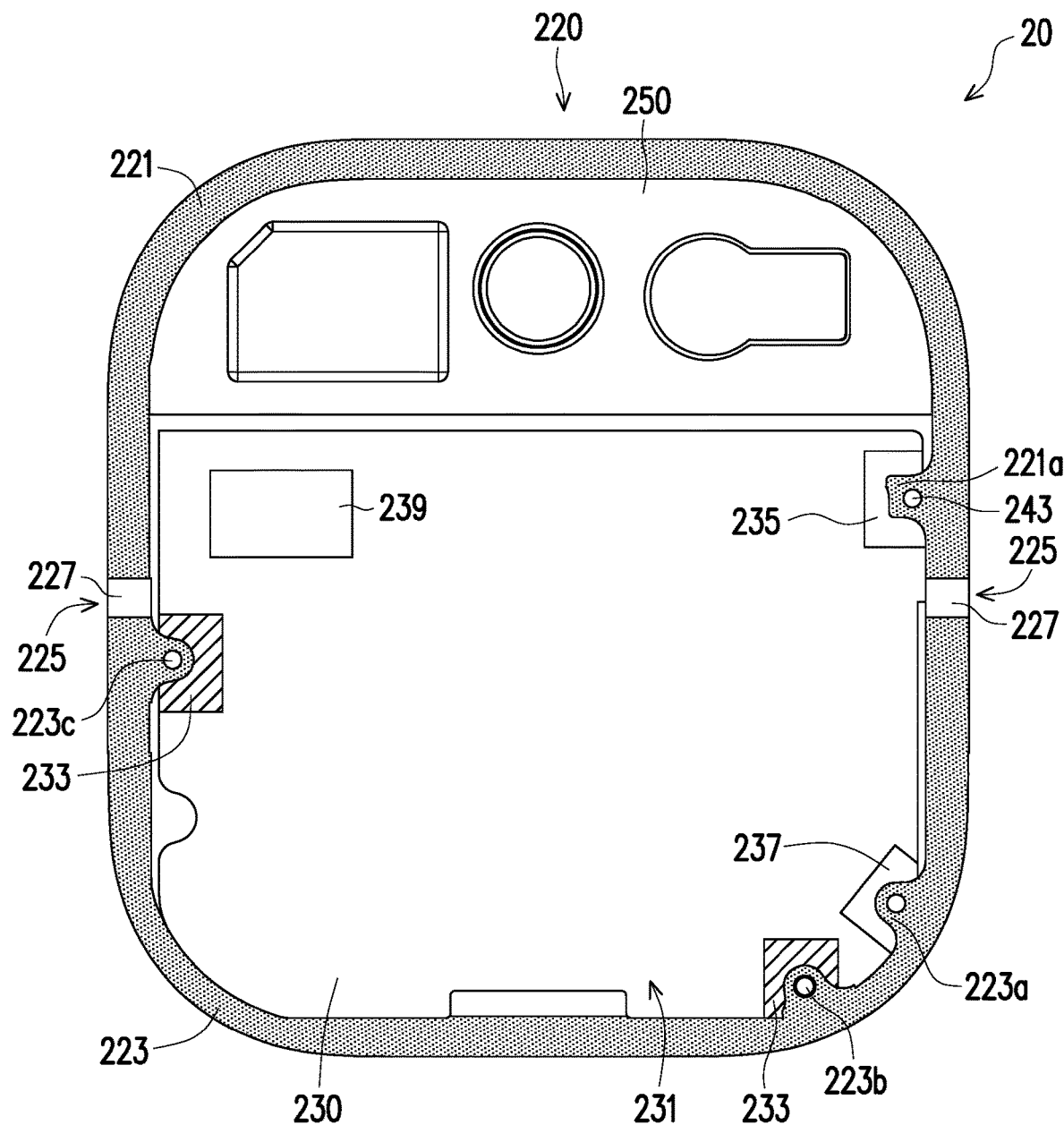
FIG. 2 is a top view of the wearable device of FIG. 1.
Figure 3:
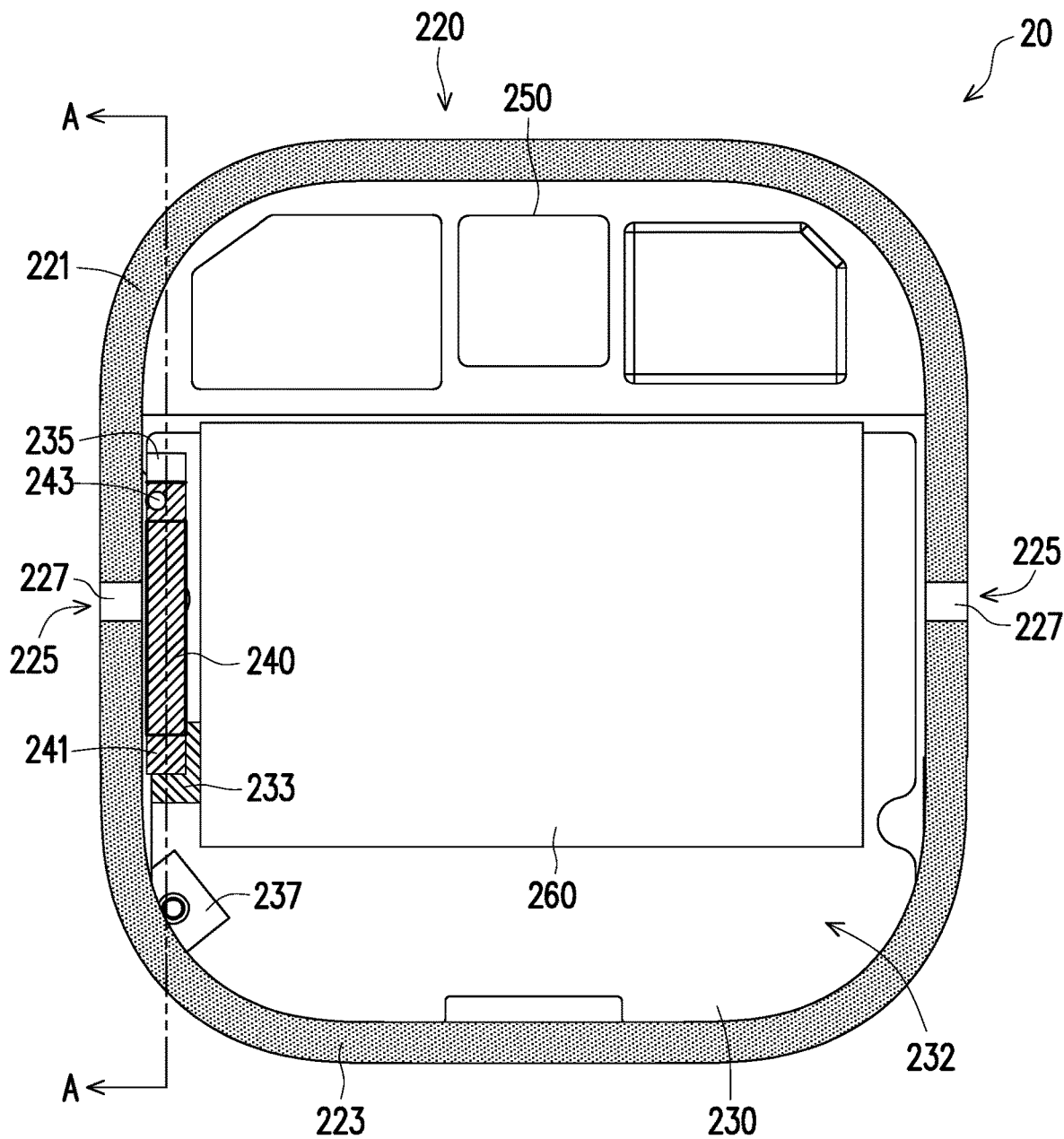
FIG. 3 is a bottom view of the wearable device of FIG. 1.

FIG. 1a is a schematic diagram of a wearable device according to an embodiment of the disclosure. FIG. 1B is an exploded view of the wearable device of FIG. 1a. FIG. 2 is a top view of the wearable device of FIG. 1. FIG. 3 is a bottom view of the wearable device of FIG. 1. Referring to FIGS. 1a to 3, a wearable device 20 of the embodiment includes an upper cover 210, a conducting frame 220, a circuit board 230, a grounding member 240, an electronic assembly 250, a battery 260, and a lower cover 270 of a non-metallic material. It should be noted that in FIGS. 2 and 3, for the convenience of description, the upper cover 210 and the lower cover 270 are hidden from the drawings.

In the embodiment, the material of the conducting frame 220 is, for example, metal, and the appearance of the metal material of the wearable device 20 may make the product more attractive and have a better texture. The conducting frame 220 includes a first part 221 and a second part 223 that are separated. The length of the first part 221 is approximately equal to the length of the second part 223, allowing the wearable device 20 to have a symmetrical appearance and increase the aesthetics, but is not limited in the disclosure. In addition, the circuit board 230 is disposed inside the conducting frame 220 and includes a system grounding surface 233 (refer to FIG. 2). The grounding member 240 (refer to FIG. 3) is disposed inside the conducting frame 220 and connected to the first part 221.

In the embodiment, the first part 221 and the grounding member 240 are formed as a first antenna A1. The second part 223 is formed as a second antenna A2. The conducting frame 220 may also be disassembled into more parts according to actual needs to form a multi-antenna structure with two and above antennas, which is not limited in the disclosure.

Please continue to refer to FIGS. 2 and 3. The first part 221 has a first feeding terminal 221a. The grounding member 240 has a first grounding terminal 241, and the first grounding terminal 241 is connected to the system grounding surface 233 of the circuit board 230.

The second antenna A2 has a second feeding terminal 223a, a second grounding terminal 223b, and a third grounding terminal 223c. The second grounding terminal 223b and the third grounding terminal 223c are connected to the system grounding surface 233 of the circuit board 230.

Conventionally, since the metal frame (i.e., the conducting frame 220) usually serves as the appearance member and the size of the conducting frame 220 is kept constant, if the length of the first part 221 is changed for adjusting the antenna matching, the second part 223 needs to be modified synchronously. In other words, when the length of the first part 221 increases, the length of the second part 223 decreases, and vice versa. In this way, although the first antenna A1 may reach the required frequency band, the frequency band of the second antenna A2 is affected accordingly.

The configuration of the grounding member 240 in the embodiment can extend the length of the first antenna A1 while maintaining the sizes of the first part 221 and the second part 223, and increase the distance between the feeding terminal and the grounding terminal (i.e., the first feeding terminal 221a and the first grounding terminal 241), so that the first antenna A1 may meet the requirement of matching the required frequency band.

In addition, the conducting frame 220 has two slits 225 at the junction of the first part 221 and the second part 223, and two insulating joint members 227 are filled in the two slits 225 to connect the first part 221 and the second part 223. The conduction of the first part 221 and the second part 223 may be prevented through the disposition of the two insulating joint members 227.

Please continue to refer to FIGS. 2 and 3. The wearable device 20 further includes at least one electronic assembly 250, disposed inside the conducting frame 220. The electronic assembly 250 is located beside the circuit board 230 and close to the first part 221, and the circuit board 230 is close to the second part 223. In the embodiment, the at least one electronic assembly 250 includes at least one of a stereo camera, a center camera, and a laser projector, but the disclosure is not limited thereto.

In the embodiment, most of the first part 221 is close to the edge of the electronic assembly 250, and the portion of the first part 221 that is close to the circuit board 230 is only near the two ends of the first part 221. Therefore, the first feeding terminal 221a can only be selectively disposed on one of the two ends of the first part 221, which is relatively limited.

In contrast, the second part 223 is all located at the edge of the circuit board 230, so the second feeding terminal 223a may be disposed at any position on the second part 223, and is not limited to the two ends.

Figure 4:
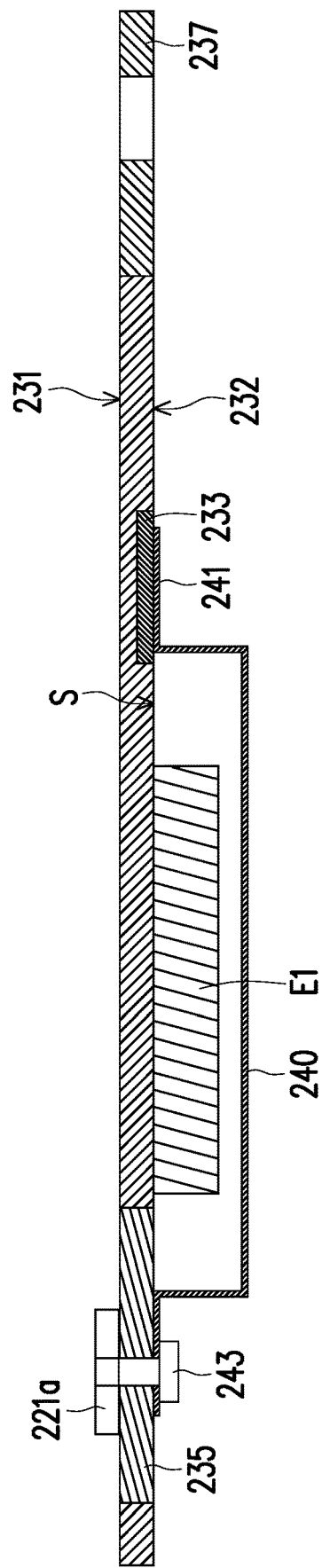
FIG. 4 is a partial cross-sectional view of the wearable device of FIG. 3 along a line A-A.

FIG. 4 is a partial cross-sectional view of the wearable device of FIG. 3 along a line A-A. Please refer to FIGS. 2 to 4. Specifically, the circuit board 230 further includes a first surface 231 and a second surface 232 opposite to each other, the first feeding terminal 221a is located on the first surface 231 of the circuit board 230, and the grounding member 240 is located on the second surface 232 of the circuit board 230. One end of the grounding member 240 is connected to the first feeding terminal 221a through a conducting member 243 passing through the circuit board 230, and the first grounding terminal 241 of the grounding member 240 is at the other end of the grounding member 240 and is connected to the system grounding surface 233 of the circuit board 230.

In the embodiment, the grounding member 240 has a three-dimensional structure, such as an inverted Ω type as shown in FIG. 4, but the disclosure is not limited thereto. Please continue to refer to FIG. 4. The length of the grounding member 240 may be adjusted according to the matching of the modes, and the limited space may be used flexibly. The grounding member 240 is located beside the battery 260, and an accommodating space S is formed between the grounding member 240 and the second surface 232 of the circuit board 230. An electronic element E1 may be located in the accommodating space S to increase the space utilization of the circuit board 230. That is, the three-dimensional structure design adopted by the grounding member 240 may not only utilize the interior space of the wearable device 20 to increase the length of the first part 221, but also provide a space for accommodating the electronic element E1, so that the electronic element E1 can still be disposed on the second surface 232 without being affected by the grounding member 240.

In addition, the material of the grounding member 240 is, for example, metal, but is not limited in the disclosure. Alternatively, Laser Direct Structuring (LDS) technology may be used to allow plastic with metal traces to replace metal, so as to improve the flexibility in use.

Please refer to FIG. 2 again. In the embodiment, the circuit board 230 further includes a first clearance area 235, a second clearance area 237, and a matching circuit 239. The first clearance area 235 is disposed on the circuit board 230 corresponding to the first feeding terminal 221a. The second clearance area 237 is disposed on the circuit board 230 corresponding to the second feeding terminal 223a. As shown in FIG. 2, the matching circuit 239 is connected to one end of the first part 221. More specifically, the matching circuit 239 is connected to one end of the first part 221 that is away from the first feeding terminal 221a. In one embodiment, the matching circuit 239 may also be disposed beside the first feeding terminal 221a and connected to the first feeding terminal 221a. The wearable device 20 may achieve different low frequency band requirements (607 to 960 MHz) or improve the matching effect by switching different matching circuits 239.

Referring to FIG. 3, the battery 260 is disposed inside the conducting frame 220 and stacked on the second surface 232 of the circuit board 230. Of course, the battery 260 may also be disposed on the first surface 231 of the circuit board 230 or other positions in the conducting frame 220 according to design requirements, which is not limited in the disclosure.

The following describes the operating frequency bands of the first antenna A1 and the second antenna A2 of the wearable device 20 and the differences between the wearable devices with and without the grounding member.

In the embodiment, the first antenna A1 excites a first frequency band B1, and the length of the first part 221 and the grounding member 240 is a quarter wavelength of the first frequency band B1. The first frequency band B1 is, for example, a low frequency band of 607 to 960 MHz, but is not limited thereto. In the embodiment, the operating frequency band of the first antenna A1 covers the low frequency band of 607 to 960 MHz, an intermediate frequency band of 1710 to 2200 MHz, and a high frequency band of 2496 to 2690 MHz.

The second antenna A2 excites a second frequency band B2, and the length of the second part 223 is a quarter wavelength of the second frequency band B2. The second frequency band B2 is, for example, the intermediate frequency band of 1710 to 2200 MHz, but is not limited thereto. The operating frequency band of the second antenna A2 covers a GPS frequency band of 1575 MHz, the intermediate frequency band of 1710 to 2200 MHz, a Wi-Fi frequency band of 2400 to 2480 MHz, and the high frequency band of 2496 to 2690 MHz.

Figure 5:
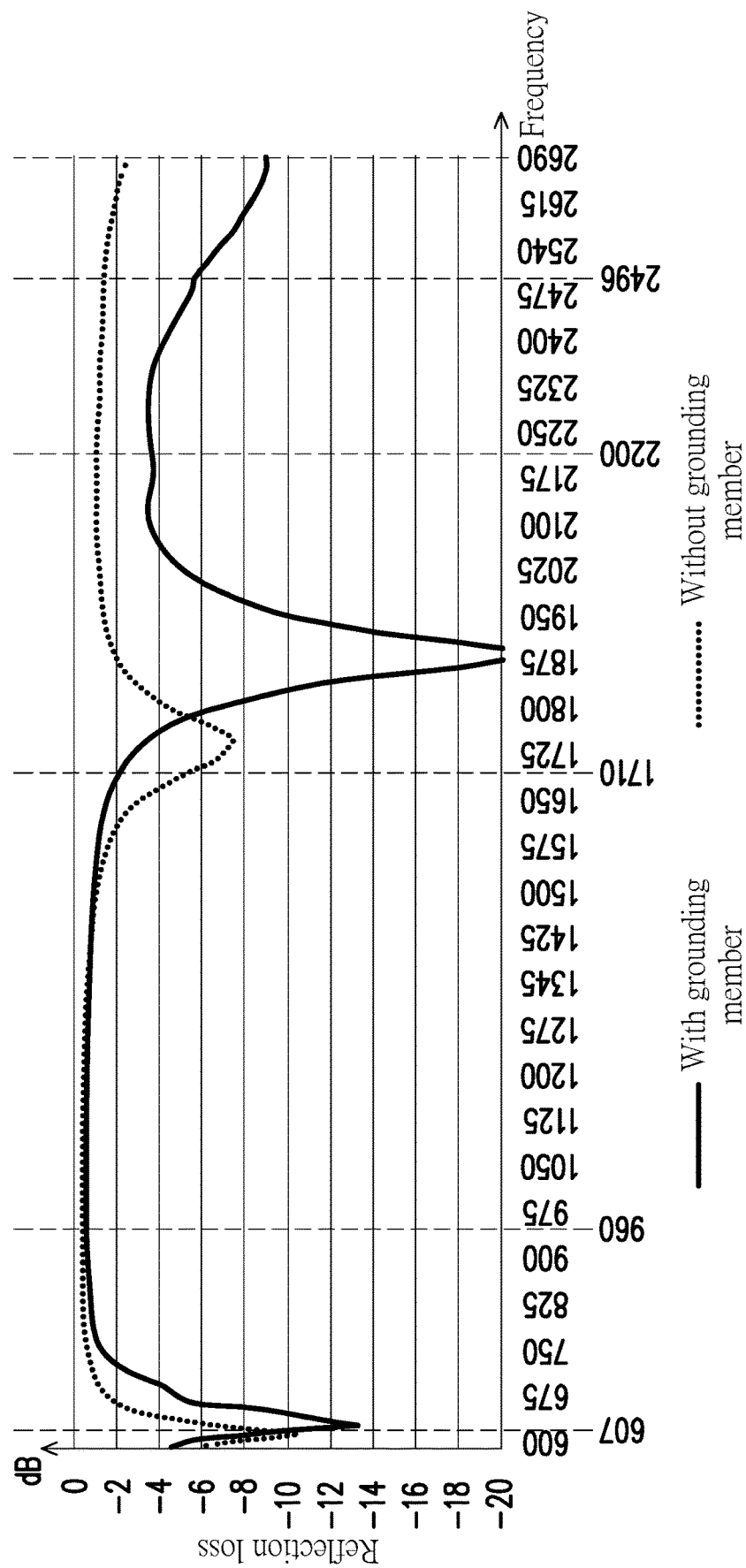
FIG. 5 is a schematic diagram showing the relationship between a frequency band and the reflection loss of the first antenna with and without the grounding member.

FIG. 5 is a schematic diagram showing the relationship between a frequency band and reflection loss of the first antenna with and without the grounding member in the wearable device. Referring to FIG. 5, in the comparison between the antenna without the grounding member (only the first part 221 is formed as the first antenna) and the antenna A1 with the grounding member (the first part 221 and the grounding member 240 are formed as the first antenna), in the low frequency band (607 to 960 MHz), the reflection loss of the antenna without the grounding member is as low as −10 dB, and the reflection loss of the antenna with the grounding member is as low as −13 dB; in the intermediate frequency band (1710 to 2200 MHz), the reflection loss of the antenna without the grounding member is as low as −7 dB, and the reflection loss of the antenna with the grounding member is as low as −20 dB; and in the high frequency band (2496 to 2690 MHz), the reflection loss of the antenna without the grounding member is as low as −2 dB, and the reflection loss of the antenna with the grounding member is as low as −9 dB.

In short, the reflection loss of the wearable device 20 with the grounding member of the disclosure performs better in the low frequency band (607 to 960 MHz), the intermediate frequency band (1710 to 2200 MHz), and the high frequency band B3 (2496 to 2690 MHz) compared with the reflection loss of the wearable device without the grounding member.

Figure 6B:
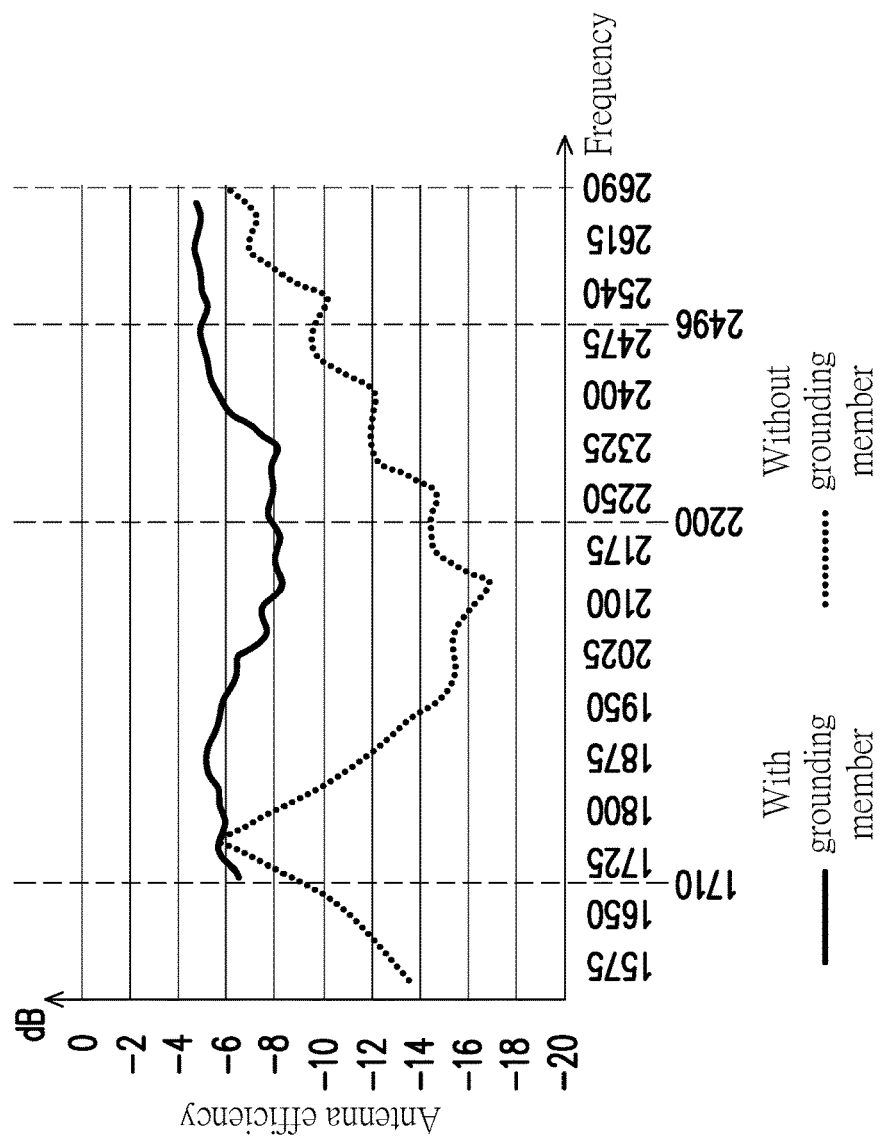
FIG. 6b is a schematic diagram showing the relationship between another frequency band and the antenna efficiency of the first antenna with and without the grounding member.
Figure 6A:
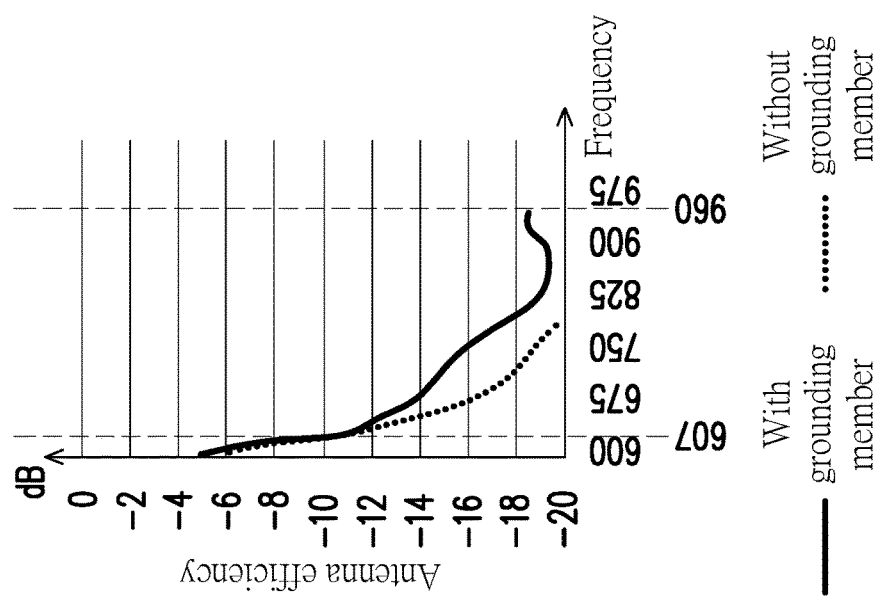
FIG. 6a is a schematic diagram showing the relationship between the frequency band and the antenna efficiency of the first antenna with and without the grounding member.

FIG. 6a is a schematic diagram showing the relationship between a frequency band and the antenna efficiency of the first antenna with and without the grounding member. FIG. 6b is a schematic diagram showing the relationship between another frequency band and the antenna efficiency of the first antenna with and without the grounding member. Please refer to FIGS. 6a and 6b. In the comparison between the antenna with and without the grounding member, in the intermediate frequency band (1710 to 2200 MHz), the antenna efficiency without the grounding member is as low as −8 dB, and the antenna efficiency with the grounding member is as low as −17 dB; and in the high frequency band (2496 to 2690 MHz), the antenna efficiency without the grounding member is as low as −7 dB, and the antenna efficiency with the grounding member is as low as −10 dB.

That is, the antenna efficiency of the wearable device 20 of the embodiment performs better in the low frequency band (607 to 960 MHz), the intermediate frequency band (1710 to 2200 MHz), and the high frequency band (2496 to 2690 MHz) compared with the antenna efficiency of the wearable device without the grounding member.

Figure 7:
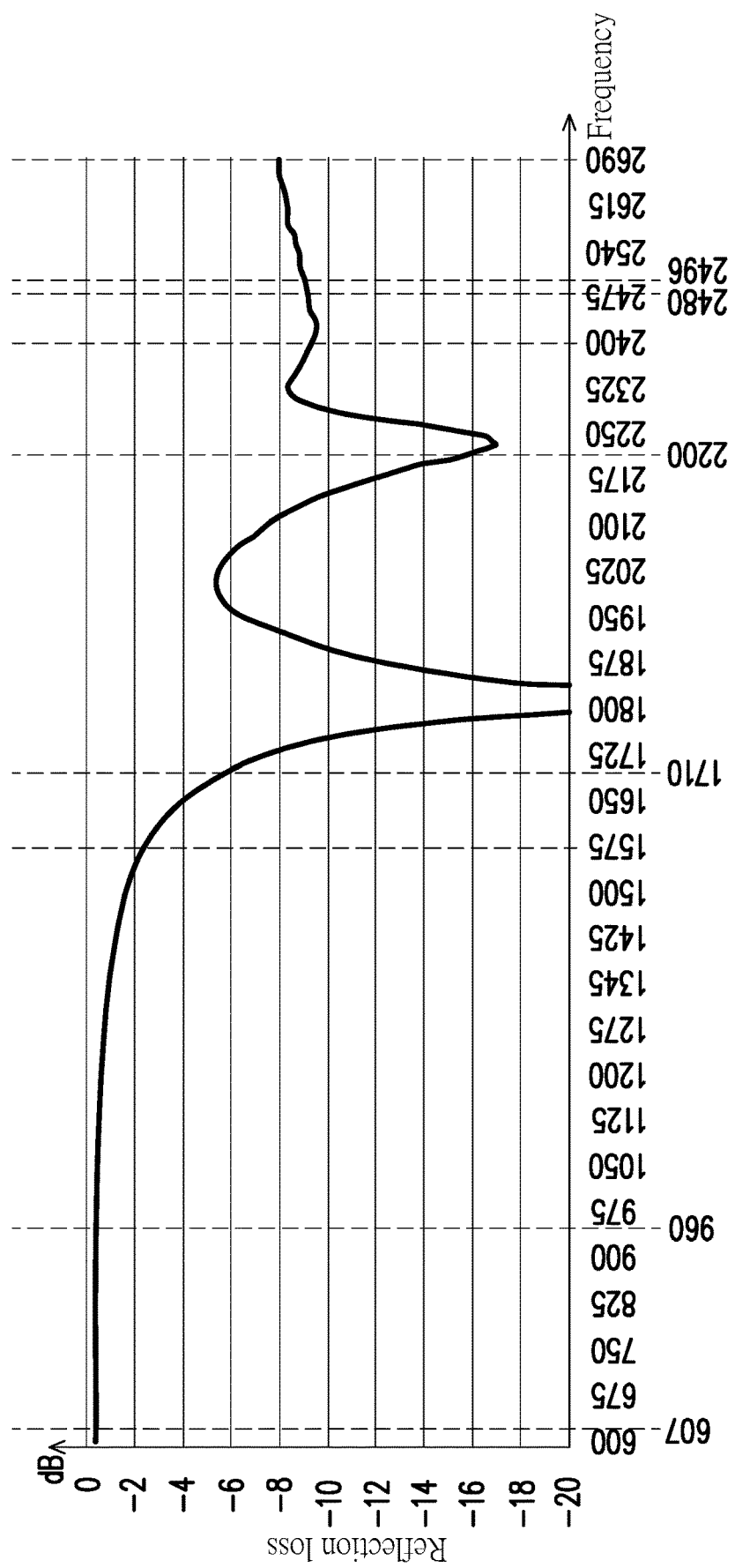
FIG. 7 is a schematic diagram showing the relationship between the frequency band and the reflection loss of the second antenna of the wearable device.
Figure 8:
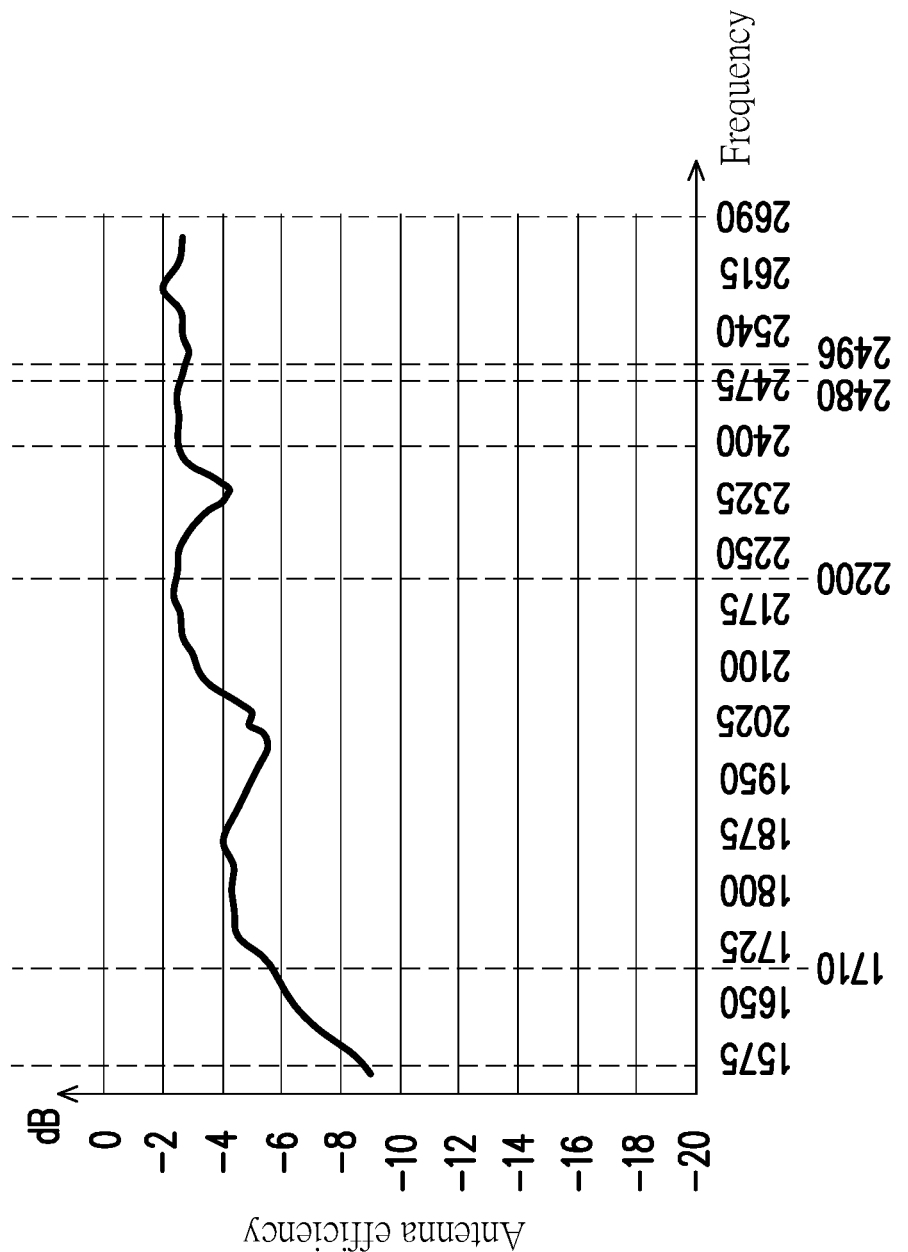
FIG. 8 is a schematic diagram showing the relationship between the frequency band and the antenna efficiency of the second antenna of the wearable device.

FIG. 7 is a schematic diagram showing the relationship between the frequency band and reflection loss of the second antenna of the wearable device. FIG. 8 is a schematic diagram showing the relationship between the frequency band and the antenna efficiency of the second antenna of the wearable device. Please refer to FIGS. 7 and 8. In the embodiment, the second antenna A2 of the wearable device 20 has good performance in the reflection loss and the antenna efficiency in the GPS frequency band (1575 MHz), the intermediate frequency band (1710 to 2200 MHz), the Wi-Fi frequency band (2400 to 2480 MHz), and the high frequency band (2496 to 2690 MHz).

In general, the wearable device without the grounding member (only the first part 221) cannot achieve good reflection loss when the length of the antenna is insufficient, and the operating bandwidth is also reduced, resulting in poor antenna efficiency. The disclosure may extend the length of the grounding structure of the first antenna A1 without changing the structure of the second antenna A2 through the configuration of the above-mentioned grounding member 240, so that the wearable device 20 still has a good effect of reflection loss with the miniaturized appearance, and thus obtains better antenna efficiency. Therefore, the wearable device 20 may have good performance in reflection loss and the antenna efficiency without affecting the structure of the second antenna A2.

In summary, the disclosure may extend the length of the antenna grounding structure to meet the operating frequency requirements without changing the size of the appearance member through the disposition of the grounding member, so that each of the antennas can achieve good matching. In addition, the disclosure may also adjust the impedance matching of the desired frequency band by modifying the length of the grounding member, thereby increasing the flexibility in use.

What is claimed is:

1. A wearable device, comprising:
   a conducting frame, comprising a first part and a second part that are separated;
   a circuit board, disposed inside the conducting frame and including a system grounding surface; and
   a grounding member, disposed inside the conducting frame and connected to the first part, wherein
   the first part and the grounding member are formed as a first antenna, the first part has a first feeding terminal, the grounding member has a first grounding terminal, and the first grounding terminal is connected to the system grounding surface of the circuit board,
   the second part is formed as a second antenna, the second antenna has a second feeding terminal, a second grounding terminal, and a third grounding terminal, and the second grounding terminal and the third grounding terminal are connected to the system grounding surface of the circuit board,
   wherein two slits exist at a junction of the first part and the second part, and two insulating joint members are filled in the two slits to connect the first part and the second part.

2. The wearable device according to claim 1, wherein the circuit board further comprises a first surface and a second surface opposite to each other, the first feeding terminal is located on the first surface of the circuit board, the grounding member is located on the second surface of the circuit board, and the grounding member is connected to the first feeding terminal through a conducting member passing through the circuit board.

3. The wearable device according to claim 2, wherein one end of the grounding member is connected to the first feeding terminal of the first part through the conducting member, and the first grounding terminal of the grounding member is at the other end of the grounding member.

4. The wearable device according to claim 2, further comprising:
   a battery, disposed inside the conducting frame and stacked on the second surface of the circuit board.

5. The wearable device according to claim 4, wherein the grounding member has a three-dimensional structure, the grounding member is located beside the battery, an accommodating space is formed between the grounding member and the second surface of the circuit board, and an electronic element is located in the accommodating space.

6. The wearable device according to claim 5, wherein the three-dimensional structure has a shape of an inverted omega symbol.

7. The wearable device according to claim 1, wherein the circuit board further comprises a matching circuit, the matching circuit is connected to the first feeding terminal or one end of the first part that is away from the first feeding terminal.

8. The wearable device according to claim 1, wherein a length of the first part is equal to a length of the second part.

9. The wearable device according to claim 1, wherein the circuit board further includes a first clearance area and a second clearance area, the first clearance area is disposed on the circuit board corresponding to the first feeding terminal, and the second clearance area is disposed on the circuit board corresponding to the second feeding terminal.

10. The wearable device according to claim 1, wherein the first antenna excites a first frequency band, a length of the first part and the grounding member is a quarter wavelength of the first frequency band, the second antenna excites a second frequency band, and a length of the second part is a quarter wavelength of the second frequency band.

11. The wearable device according to claim 1, wherein an operating frequency band of the first antenna covers the low frequency band of 607 to 960 MHz, an intermediate frequency band of 1710 to 2200 MHz, and a high frequency band of 2496 to 2690 MHz.

12. The wearable device according to claim 1, wherein an operating frequency band of the second antenna covers a GPS frequency band of 1575 MHz, the intermediate frequency band of 1710 to 2200 MHz, a Wi-Fi frequency band of 2400 to 2480 MHz, and the high frequency band of 2496 to 2690 MHz.

13. The wearable device according to claim 1, further comprising:
at least one electronic assembly, disposed inside the conducting frame, located beside the circuit board, and close to the first part.

14. The wearable device according to claim 13, wherein the at least one electronic assembly comprises at least one of a stereo camera, a center camera, and a laser projector.

15. The wearable device according to claim 14, wherein the first feeding terminal is selectively disposed on one of the two ends of the first part, and the second feeding terminal is disposed at any position of the second part.

* * * * *